(12) United States Patent
Brannock et al.

(10) Patent No.: US 8,028,282 B2
(45) Date of Patent: *Sep. 27, 2011

(54) SYSTEM FOR ATOMICALLY UPDATING A PLURALITY OF FILES

(75) Inventors: Kirk D. Brannock, Olympia, WA (US); William A. Stevens, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 1078 days.

This patent is subject to a terminal disclaimer.

(21) Appl. No.: 11/893,342

(22) Filed: Aug. 14, 2007

(65) Prior Publication Data

US 2007/0288914 A1    Dec. 13, 2007

Related U.S. Application Data

(63) Continuation of application No. 09/967,093, filed on Sep. 28, 2001, now Pat. No. 7,299,463.

(51) Int. Cl.
    *G06F 9/44* (2006.01)
(52) U.S. Cl. .......................... 717/169; 717/131
(58) Field of Classification Search .......... 717/120–122, 717/131, 168–172
    See application file for complete search history.

(56) References Cited

U.S. PATENT DOCUMENTS

| | | |
|---|---|---|
| 5,150,473 A | 9/1992 | Zulch |
| 5,404,485 A | 4/1995 | Bah |
| 5,751,282 A | 5/1998 | Girard et al. |
| 5,835,761 A | 11/1998 | Ishii et al. |
| 5,930,504 A | 7/1999 | Gabel |
| 6,088,759 A | 7/2000 | Hasbun et al. |
| 6,167,567 A | 12/2000 | Chiles et al. |
| 6,260,156 B1 | 7/2001 | Garvin et al. |
| 6,282,709 B1 | 8/2001 | Reha et al. |
| 6,467,087 B1 | 10/2002 | Yang |
| 6,536,038 B1 | 3/2003 | Ewertz et al. |
| 6,640,334 B1 | 10/2003 | Rasmussen |
| 6,678,741 B1 | 1/2004 | Northcutt et al. |
| 6,718,407 B2 | 4/2004 | Martwick |
| 6,889,340 B1 | 5/2005 | Bramley, Jr. |
| 7,299,463 B2 * | 11/2007 | Brannock et al. ............. 717/169 |

FOREIGN PATENT DOCUMENTS

| | | |
|---|---|---|
| EP | 0 723 226 A1 | 7/1996 |
| EP | 1 087 294 A2 | 3/2001 |
| GB | 2 354 863 A | 4/2001 |

OTHER PUBLICATIONS

PCT/US02/30883—PCT Written Opinion, dated Aug. 7, 2004.

(Continued)

*Primary Examiner* — Ted T Vo

(74) *Attorney, Agent, or Firm* — Blakely, Sokoloff, Taylor & Zafman LLP

(57) ABSTRACT

A method for updating platform firmware is disclosed. This capability is facilitated by a standard software abstraction for a firmware storage device, known as Firmware Volume (FV) that is managed through a Firmware File System (FFS). The FFS enables firmware files to be created, deleted, and updated individually. The FFS also enables a plurality of firmware files to be updated atomically by managing file state information via state bits stored in a file header of each firmware file, whereby an atomic change to a single state bit simultaneously causes the FFS to use an updated set of firmware files in place of an original set of firmware files.

18 Claims, 12 Drawing Sheets

OTHER PUBLICATIONS

PCT/US02/30883—PCT International Preliminary Examination Report, dated Aug. 13, 2004.
PCT/US 02/30883, Feb. 5, 2004, International Search Report.
IBM, "A Technical Introduction to PCI-Based RS/6000 Servers", IBM International Technical Support Organization, Austin Center, pp. i-xxi, 1-194, 1996.

* cited by examiner

SYSTEM FOR ATOMICALLY UPDATING A PLURALITY OF FILES

CROSS-REFERENCE TO RELATED APPLICATIONS

The present application is a Continuation of U.S. Ser. No. 09/967,093, filed Sep. 28, 2001 now U.S. Pat. No. 7,299,463.

BACKGROUND OF THE INVENTION

1. Field of the Invention

The present invention concerns computer systems in general, and the management of platform firmware in particular.

2. Background Information

Computer platform firmware is used during initialization of computer systems to verify system integrity and configuration. It also generally provides the basic low-level interface between hardware and software components of those computer systems, enabling specific hardware functions to be implemented via execution of higher-level software instructions contains in computer programs that run on the computer systems. In computers, a primary portion of this firmware is known as the Basic Input/Output System (BIOS) code of a computer system. The BIOS code comprises a set of permanently recorded (or semi-permanently recorded in the case of systems that use Flash Memory BIOS) software routines that provides the system with its fundamental operational characteristics, including instructions telling the computer how to test itself when it is turned on, and how to determine the configurations for various of built-in components and add-on peripherals.

In a typical PC architecture, the BIOS is generally defined as the firmware that runs between the processor reset and the first instruction of the Operating System (OS) loader. As shown in FIG. 1, in a typical PC 10, the base portion of the BIOS code is stored in some type of ROM (read only memory) device on the PC's motherboard 12, such as a standard PROM 14 or a Flash Memory 16. In some configurations, this base portion may be extended using code stored in ROM BIOS chips 18 contained on one or more add-on peripheral cards 20, such as SCSI controllers and bus-mastering devices. This portion of the BIOS is stored in components that are commonly referred to as "option ROMs." The BIOS code in peripheral card ROM BIOS chips 18 typically concerns specific functionality provided by their corresponding peripheral card and is executed during initialization of that peripheral card according to a well-defined (mostly) set of rules. In either of the foregoing configurations, all BIOS firmware is stored locally, either on the motherboard or in option ROMs on the peripheral card(s) added to a system.

In many instances, the basic functionality of a computer system platform is defined by the platform's firmware. Accordingly, in order to enhance this functionality, corresponding code needs to be added to or modified in the firmware. In today's PC's, this may be accomplished by either replacing the BIOS chip(s) on the motherboard (and/or peripheral cards), or, if the BIOS code is contained in rewritable chips (e.g., Flash Memory), executing a BIOS update software program that rewrites (overwrites) the BIOS code.

Both of these methods may be prone to error. Replacement of a BIOS chip by a novice user may lead to several problems, including improper insertion of the new chip, damage of the new chip, damage of the socket, static electricity damage to the new chip and/or existing chips on the motherboard. Popular methods for updating the BIOS code stored on a flash component also have risks. For instance, a user may try to update the BIOS code with an inappropriate set of new code, or a crash could occur in the middle of the update process. Typically, the BIOS code will be stored as a monolithic chunk of code that gets replaced in its entirety by a new monolithic chunk of code. When the BIOS code is stored on a flash component, the memory blocks corresponding to the portions of memory that are to contain the new BIOS code must first be cleared (i.e., reset to all 1's) prior to rewriting the memory. This clearing process wipes out the existing BIOS code. As a result, if a failure occurs in the middle of a rewrite or update, the BIOS code will be corrupt. Suppose a power system failure occurs that causes the user to have to reboot the computer system. Since the BIOS code is typically needed to complete the boot process, the user may not be able to boot the computer system to fix the problem, or an emergency repair disk (that the user often doesn't have) may be need to enable the problem to be fixed.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE ILLUSTRATED EMBODIMENTS

Figure 1:
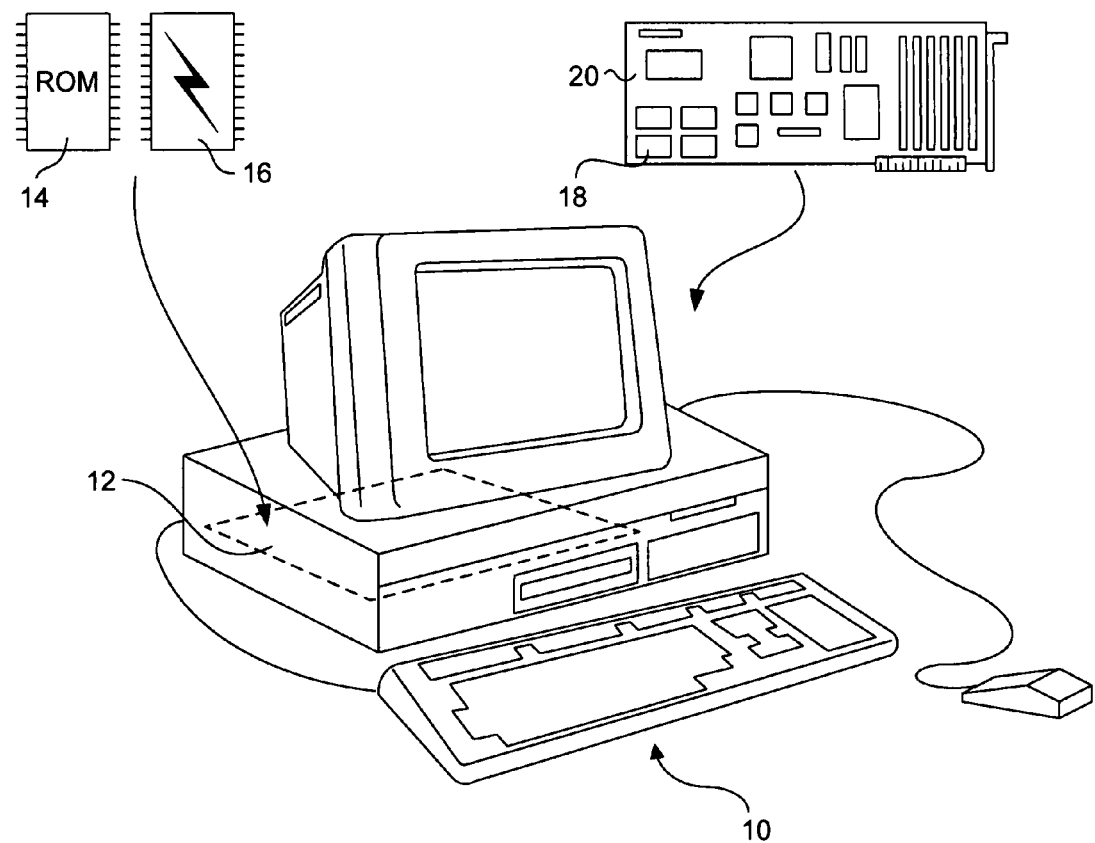
FIG. 1 is a schematic diagram illustrating how BIOS firmware is stored in a conventional personal computer.

In the following description, numerous specific details are provided to provide a thorough understanding of embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Extensible Firmware Interface and Firmware Volumes

Recently, the Intel Corporation has introduced a new firmware paradigm that enables firmware storage to be extended beyond the traditional monolithic storage schemes found in the prior art. This is enabled, in part, by the Extensible Firmware Interface, or EFI. As its name indicates, the EFI enables firmware to be "extended" through use of a standardized software interface.

One means for extending firmware is facilitated by a standard software abstraction for a firmware storage device, known as a Firmware Volume (FV). Since the FV firmware storage abstraction is not tied to any specific type of hardware, it can be used to produce firmware components to the BIOS from almost any type of firmware device. For example, in a given system, one FV may represent a Flash Memory part, while another may represent a disk partition, while yet a third may represent a remote directory on a server. A single computer system may have one or more FV's stored on one or more types of hardware.

The portions of the BIOS firmware code that are part of a FV are managed by a Firmware File System (FFS). The FFS enables one to manipulate firmware files that make up a FV. The FFS may be used for retrieving, creating, updating, and deleting firmware files. Generally, a FFS may be stored on any persistent memory device, including flash devices, disk partitions, and remote storage devices accessed via a network.

In the following paragraphs and related Figures, various embodiments of the invention are discussed with reference to a FV stored on a flash memory device. Those skilled in the art will understand that the invention may be implemented in other types of persistent storage devices for maintaining firmware code and/or data, and the embodiments of the invention using flash devices discussed below are merely exemplary schemes for practicing the invention.

Flash Memory is a non-volatile memory technology that allows manufactures and (with the appropriate hardware/software) end users to electrically program and erase information. Flash Memory is typically erased in units of memory called blocks instead of being erased at the bit level, wherein all bits in a given block are switched to predetermined polarity (i.e., logic level) when the block is erased. In one common type of flash memory, such as flash memory devices manufactured by Intel, blocks of memory are erased electronically by setting all bits in a block to 1's. Data can then be written to the block by flipping individual bits to 0's. In other types of flash devices, the erased logic state is all 0's, and writing data to these devices comprising changing individual bits to 1's. It is noted that in conventional flash devices, individual bits cannot be flipped from a changed (i.e., set) logic level back to the erased logic level; in order to updated data in a block, all of the bits have to be erased first, and then rewritten.

Figure 2:
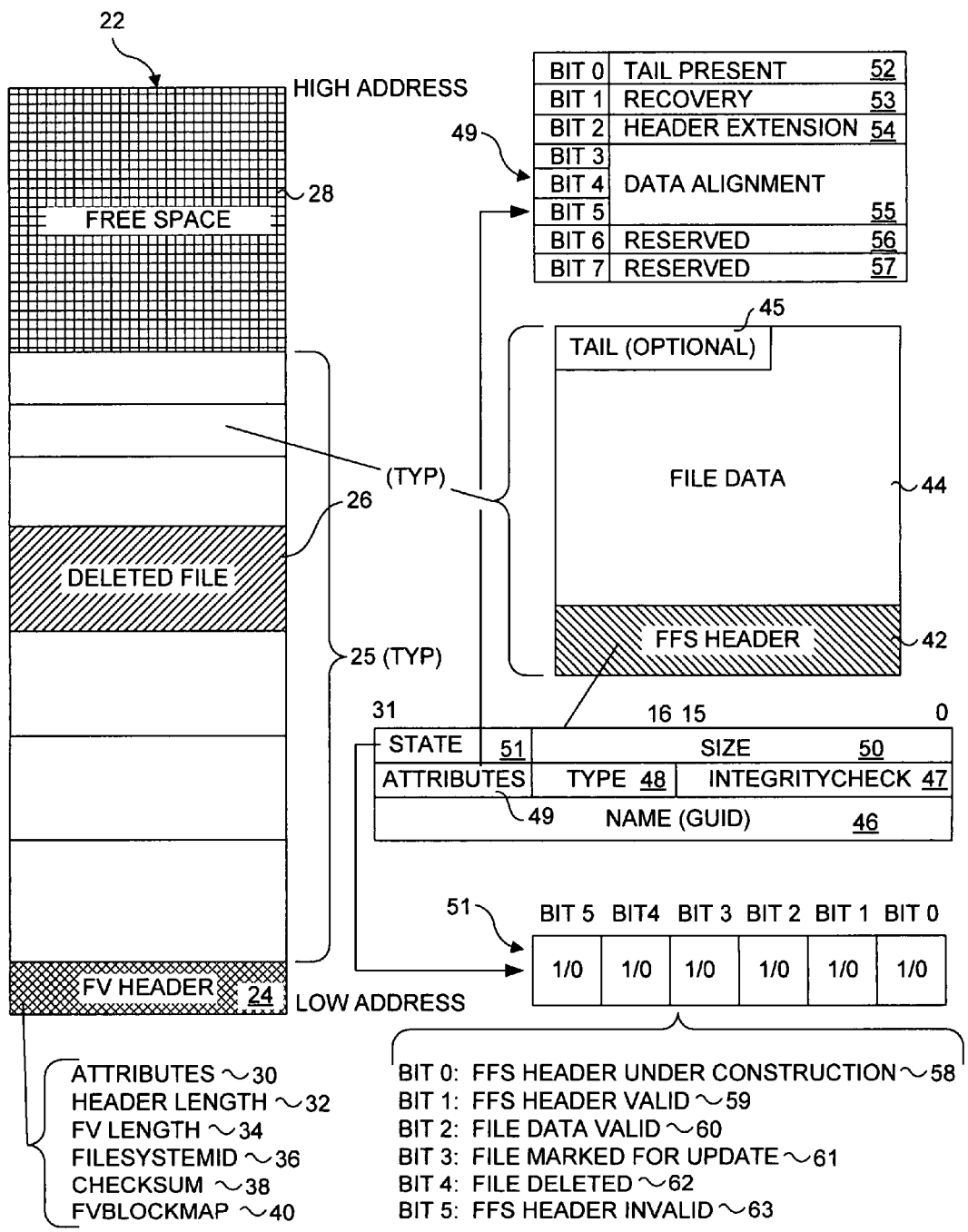
FIG. 2 is a schematic diagram illustrating an exemplary firmware volume firmware storage scheme and associated file system under which the invention may be implemented.

An exemplary FV 22 stored on a flash device that uses 1's for its erased state is shown in FIG. 2. FV 22 includes a FV header 24 and a plurality of FFS files 25. The start of FV header 24 is stored at the lowest memory address of the flash device, while each FFS file 25 begins on the next byte boundary following the end of an immediately preceding file or file header (when applicable). In one embodiment, byte boundaries occur every 8 bytes, and files sizes have 8 byte increments. Included among FFS files 25 is a deleted file 26. As explained in further detail below, deleted file 26 includes a file header that identifies that the file is considered by the FFS to be deleted, even though the deleted file's data may still exist in the FV in the same state that is was before the file was marked as deleted. In general, FFS files 25 are written sequentially, wherein free space 28 represents any remaining available space in the FV, and is located toward the top address portion (i.e., the higher memory addresses) of the flash device.

FV header 24 includes a plurality of data fields, including an attributes field 30, a header length field 32, a FV length field 34, a FileSystemID field 36, a checksum field 38, and an FVBlockMap field 40. Attributes field 30 includes a plurality of bits that include Read/Write capabilities, power-on state, "sticky" write data, a memory mapped flag, and an erase polarity identifier. Header length field 32 contains the length of the FV header in bytes. FV length field 34 contains the length of the entire FV in bytes. FileSystemID field 36 declares what file system the FV is formatted with. Checksum field 38 comprises a 16-bit checksum of the entire FV header. FVBlockMap field 40 comprises an array of run-length-encoded block structure descriptors, including a plurality of tuples {NumBlocks, Blocklength} terminated by a {0, 0} tuple.

Each FFS file 25 includes an FFS header 42 and file data 44. Optionally, file data 44 may include a tail 45, which is used for file integrity checking purposes. FFS header 42 includes various data fields, including a name field 46, an IntegrityCheck field 47, a type field 48, an attributes field 49, a size field 50, and a state field 51. In one embodiment, name 46 comprises a GUID (Globally Unique Identifier) that is issued by the firmware file system, and is guaranteed to be unique within the firmware volume. IntegrityCheck field 47 contains data that is used to verify the integrity of files, as explained in further detail below. Type field 48 identifies the file type and internal format of the file, such as a DXE driver, PEIM, etc. Size field 50 contains the length of the file (including the file header) in bytes.

Files in the FV are located using a chaining mechanism, wherein the length of a current file is added to the starting address of the file to locate the start of the next file in the chain. In addition, the first file in the FV immediately proceeds the end of FV header 24, wherein the address of the first file is determined based by the value in FV length 34.

As depicted toward the upper right corner of FIG. 2, attributes field 49 includes six data bits (plus two reserved bits) that define various attributes of the file. These attribute bits include a file tail present bit 52, a file recovery bit 53, a header extension bit 54, and a 3-bit data alignment subfield 55 comprising bits 2, 3, and 4 of attributes field 49. Attributes field 49 also includes two reserved bits 56 and 57.

File tail present bit 52 indicates that a 16-bit file tail 45 exists at the end of the file. Recovery bit 53 indicates the file is required to execute a crisis recovery. Header extension bit 54 is reserved for future extensions. Data alignment subfield 55 comprises a 3-bit field that indicates how the beginning of the data is to be aligned on a particular boundary relative to the FV base. The three bits in this field provide an enumeration of alignment possibilities, such as an 8-byte alignment.

Further details of state field 51 are shown in the lower right hand portion of FIG. 2. State field 51 is an eight-bit field that includes six state bits that are used to track the current state of a file operation, which are used during file creation, deletion, and updates. The state bits include an FFS under construction bit 58 (bit 0), a FFS header valid bit 59 (bit 1), a data area valid bit 60 (bit 2), a file marked for update bit 61 (bit 3), a file deleted bit 62 (bit 4), and an FFS header invalid bit 65 (bit 5). In addition to these state bits, bits 6 and 7 (not shown) are left in the erased state (i.e., logic level FALSE) throughout all operations. In all state change operations described below, all state bits transitions are atomic operations, i.e., the logic level of only one state bit is changed at a time for a given file state change. In addition, the transition of a given bit to TRUE must be fully complete before any additional writes to the firmware volume are made. Furthermore, except where specifically noted, only the most significant state bit that is set to TRUE has meaning. Accordingly, lower-order state bits are superceded by higher-order state bits.

File Creation

Figure 4:
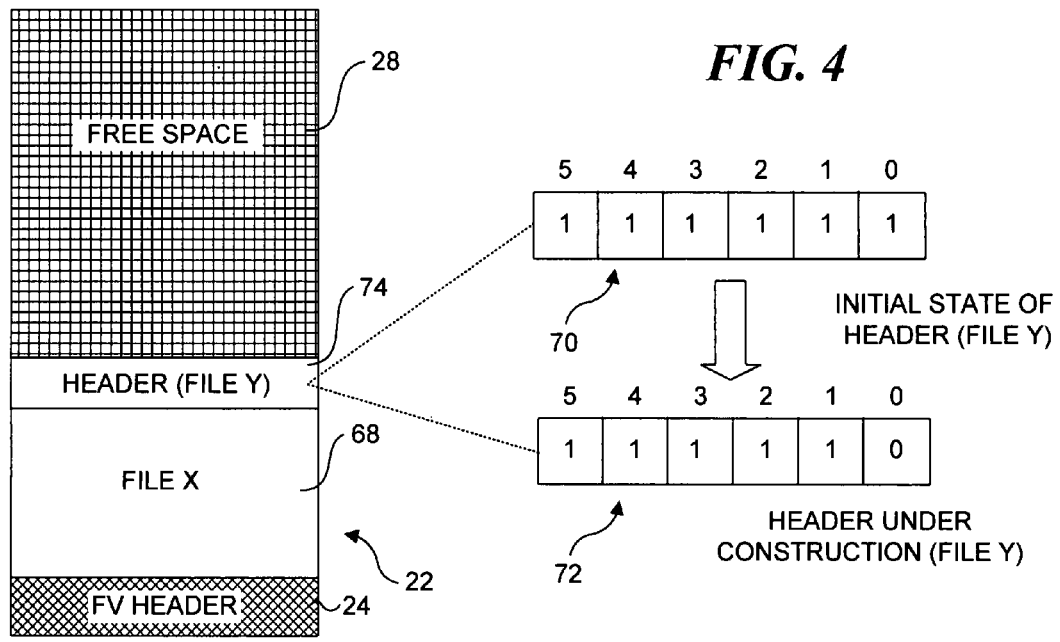
FIGS. 4 and 5 are schematic diagrams illustrating the sequential changes in a file header and the memory space of a firmware volume when a new file is created in the firmware volume.
Figure 5:
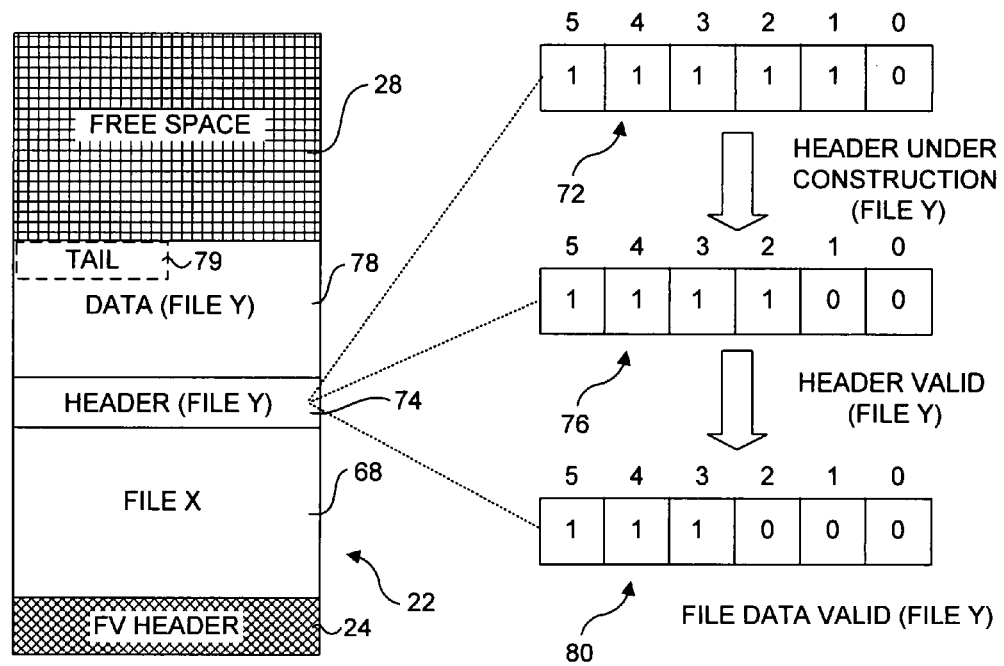

With reference to the flowchart of FIG. 3 and FIGS. 4 and 5, creation of a new file proceeds in the following manner. A new field is created by allocating space from the FV immediately beyond the end of a preceding file (or firmware volume header 24 if the new file is the first file written to the FV). Suppose FV 22 initially includes a single file X (68), and a new file Y is to be added. Accordingly, the remaining memory space above the last (highest) address occupied by file X comprises free space 28, wherein all of the bits occupying this portion of memory are set to a FALSE logic level corresponding to the erased state of the firmware device. As a result of the foregoing, the memory space to be occupied by the new file Y, including the file's header, initially comprises all 1's, as depicted by a file Y initial state 70 in FIG. 4.

The file creation process begins in a block 100, in which the file header under construction bit (58) is set to TRUE, which allocates space in the FV for the new file header. This yields a State=11111110b for file Y, which indicates the header construction for file Y has begun, but has yet to be completed. This condition is depicted in FIG. 4 as a header under construction state 72. This has the effect of "claiming" the FFS header space from FV free space 28, which is now occupied by a file Y header 74. While in this state, all of the other header fields are initialized in a block 102, by writing appropriate data to each field. This includes initializing name field 46, IntegrityCheck field 47, type field 48, attributes field 49, and size field 50. In one embodiment, name field 46 comprises a GUID that is issued by the FFS. Typically, the GUID may comprise a 32-bit, 64-bit, or 128-bit GUID, although any bit-length of GUID may be used as long as the GUID will guarantee uniqueness within the FV.

IntegrityCheck field 47 is a 16-bit field that includes three subfields: an IntegrityCheck.Checksum.Header subfield, an IntegrityCheck.Checksum.File subfield, and an IntegrityCheck.TailReference subfield. The IntegrityCheck.Checksum.Header subfield occupies the lower 8 bits of IntegrityCheck field 47, and comprises an 8-bit checksum for the file header. The State and IntegrityCheck.Checksum.File fields are assumed to be zero and the checksum is calculated such that the entire header sums to zero. The IntegrityCheck.Checksum.Header is valid anytime file header valid bit 59 is set to TRUE in state field 51.

The IntegrityCheck.Checksum.File subfield occupies the higher 8 bits of IntegrityCheck field 47, and comprises an 8-bit checksum of the entire file. State field 51 and file tail 45 are assumed to be zero and the checksum is calculated such that the entire file sums to zero. The IntegrityCheck.Checksum.File is valid anytime file data valid bit 60 is set to TRUE in state field 51.

The IntegrityCheck.TailReference subfield comprises the full 16 bits of IntegrityCheck field 47. It is used in calculating the value for file tail 45 if file tail present bit 52 is set to TRUE in attributes field 49.

After the initialization of the FFS header fields is completed, the new file header is marked as complete by setting file header valid bit 59 to TRUE in a block 104. This yields a State=11111100b, as depicted by a header valid state 76 in FIG. 5, which indicates the header construction is complete, but the file data has not yet been written. This has the effect of "claiming" the full length of the file from FV free space 28. Once file header valid bit 59 is set to TRUE, no further changes to name field 46, type field 48, attributes field 49, size field 50, or the IntegrityCheck.Checksum.Header value may be made.

While in this state, the file data, the IntegrityCheck.Checksum.File value, and the file tail (if appropriate) are written to FV 22 in a block 106, as depicted by data 78 and optional file tail 79. Whether a file tail is written will be dependent on the state of file tail present bit 52 in attributes field 49—written if the value is TRUE, not written if the value is FALSE. The file tail, which is used for file integrity checking, follows the data and comprises the last two bytes of the file's image in FV 22.

Once appropriate data has been written in block 106, an optional integrity check may be performed in a block 108. There are various file or data integrity checks that are well-known in the art that may be used for this purpose. For example, if a source image for the file is available, a bit-by-bit compare or a checksum compare can be performed against the source image and the written image (i.e., the version of the file that has just been written to FV 22). In some instances, the source image may not be available, such as in the case that the file data was written from a buffer that has since been flushed. In this case, a file integrity verification may be made by providing some indicia particular to the source file (e.g., a checksum value) that may be compared against similar indicia contained in the newly-written file.

The file creation process in completed in a block 110, in which file data valid bit 60 is set to TRUE, indicating that the file data is valid. This yields a State=11111000b, as depicted by a file data valid state 80 in FIG. 5.

File Deletion

Figure 6:
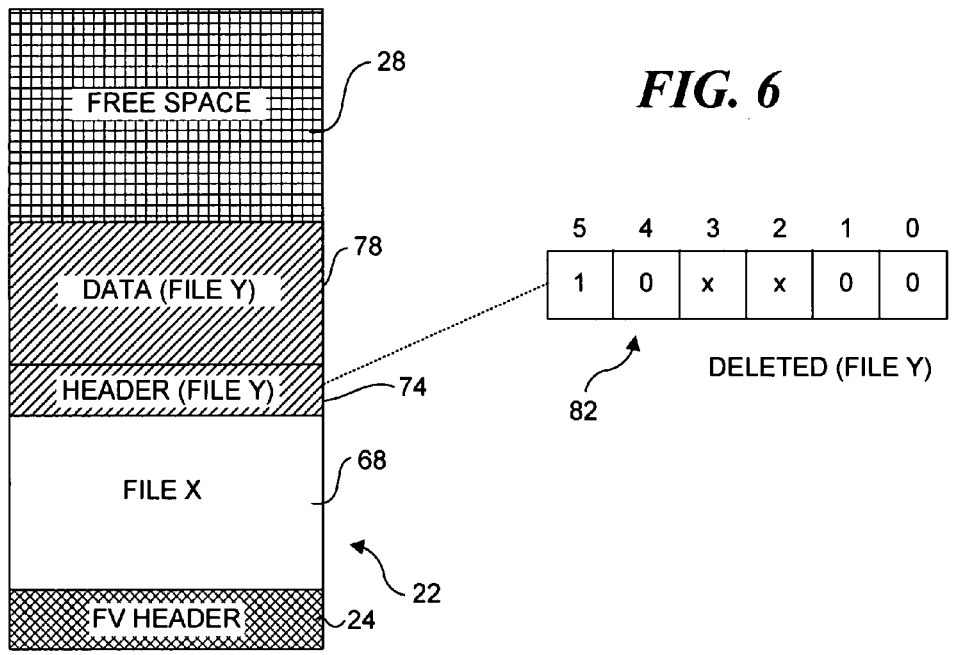
FIG. 6 is a schematic diagram illustrating how a file is deleted under the firmware file system in accordance with one embodiment of the present invention.

In addition to file creation, files may be deleted via an atomic change to state field 51. Any file with file header valid bit 59 set to TRUE and file deleted bit 62 set to FALSE is a candidate for deletion. To delete a file, file deleted bit 62 is set to TRUE, as shown in FIG. 6. As before, the transition of this bit to the TRUE state must be atomic and fully complete before any additional writes to FV 22 are made. This yields a State=1110xx00b, as depicted by a deleted file state 82, which indicates the file is marked as deleted. The "x's" in the Figures herein indicate that the value may be 1 or 0, depending on the current state. Even though the file is marked as deleted, its header is still valid, however, in as much as length file size field 50 is used in locating the start of the next file in FV 22.

File Update

Another feature provided by the firmware file system is the ability to update existing files. A file update is a special case of file creation where the file being added already exists in the firmware volume. In short, the update progress comprises transparently writing a new (updated) version of a file in a free space portion of the firmware volume, performing an atomic change to FV file header data to simultaneously validate the new file and invalidate the original file, and then marking the original file as deleted. As this work is being performed, the state bits in state field 51 of both of the files are changed, one bit at a time, in a predetermined sequence that enables full recovery in the event of an anomaly during the update, such as a power failure. Accordingly, only one of the files, either the updated file (e.g., file X') or the original file (e.g., File X), is valid at any given time.

Figure 7:
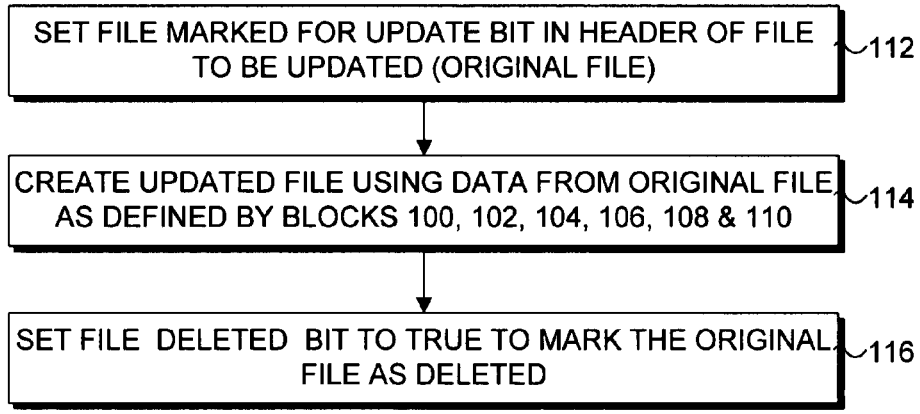
FIG. 7 is a flowchart illustrating the logic used by one embodiment of the invention when updating an existing file in the firmware volume.
Figure 8:
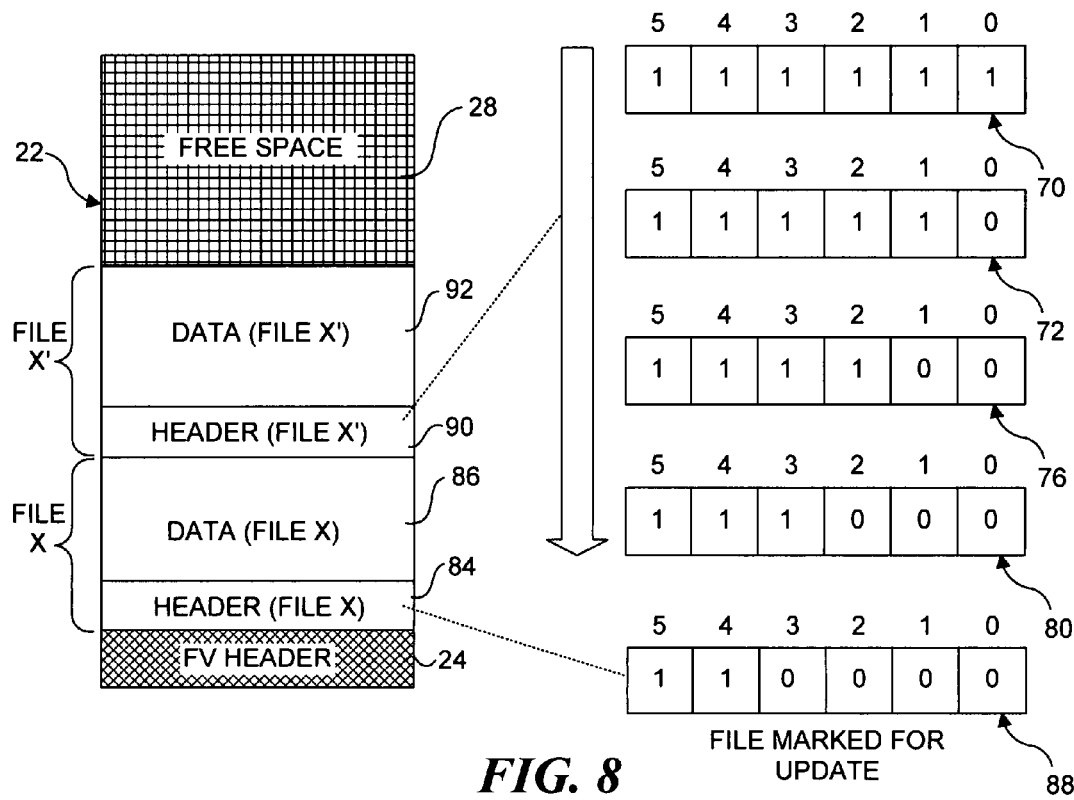
FIGS. 8 and 9 are schematic diagrams illustrating the sequential changes in a file header and the memory space of a firmware volume when a new file is created in the firmware volume.
Figure 9:
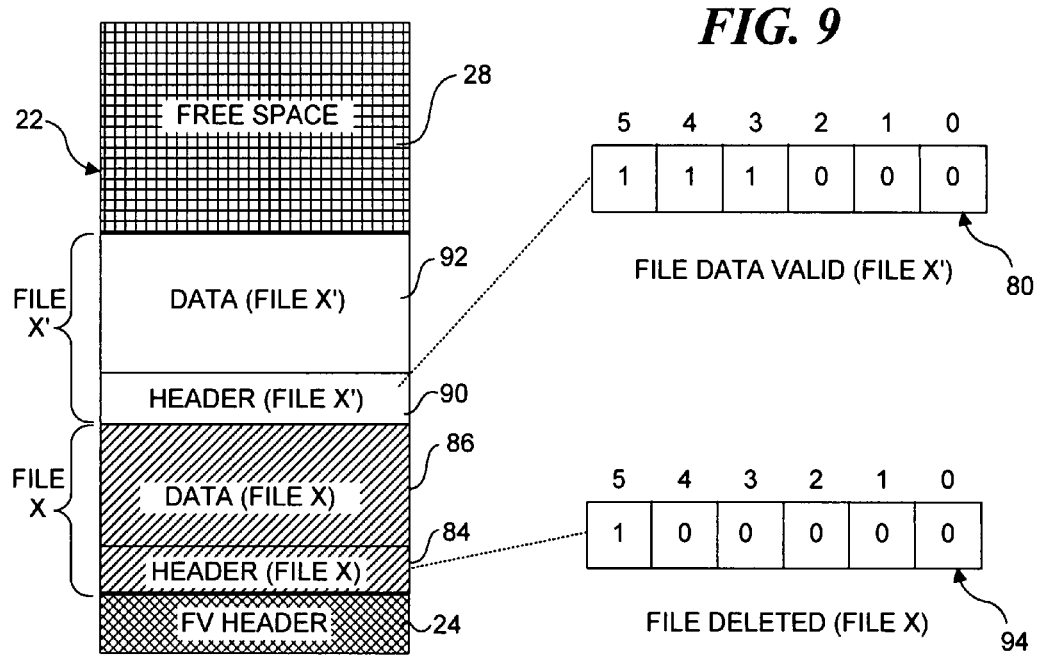

With reference to FIGS. 7-9, an embodiment of a file update by the firmware file system in which an original file X, including a file header 84 and file data 86, is updated to a file X' proceeds as follows. The process begins in a block 112 of FIG. 7, in which file marked for update bit 61 is set to TRUE in the file header (84) of the file that is to be updated, original file X. The transition of this bit to the TRUE state must be atomic and fully complete before any addition writes to FV 22 are made. This yields a State=11110000b, which indicates the file is marked for update, as shown by a file marked for update state 88 in FIG. 8. A file in this state remains valid as long as there is not another file in the firmware volume with that same name and a State=111110xxb.

Figure 3:
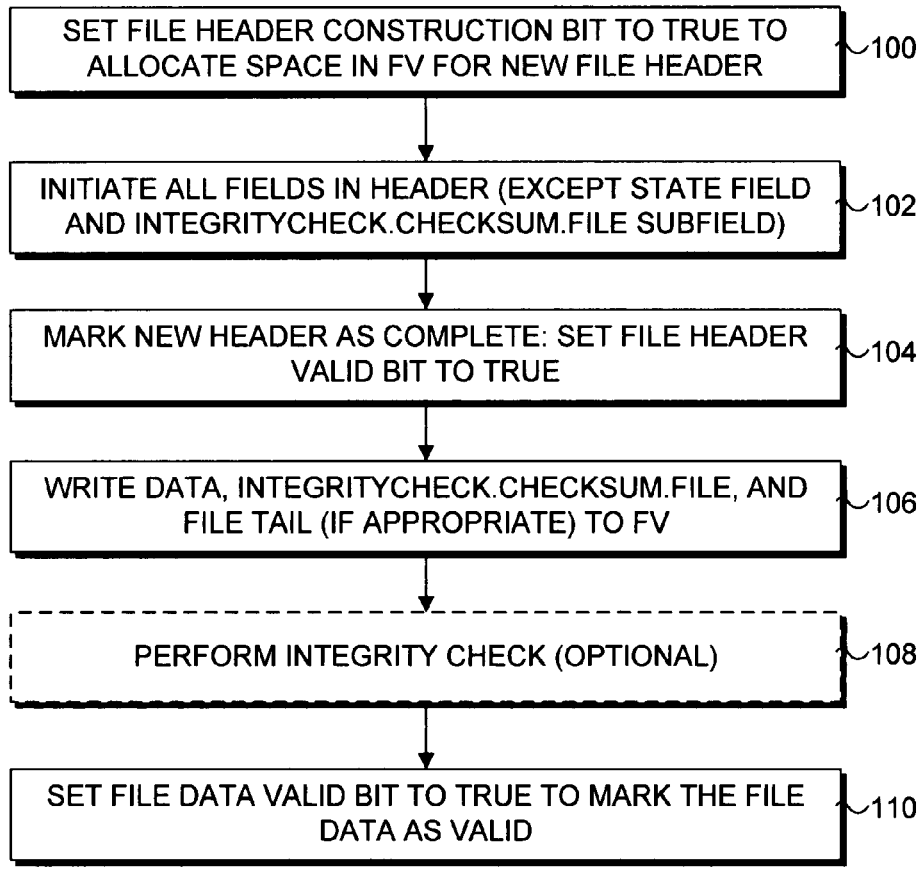
FIG. 3 is flowchart for illustrating the logic used by the invention when creating a new file in the firmware volume.

Next, in a block 114, the new updated file, file X', is created in the same manner discussed above with reference to FIGS. 4-5 and process blocks 100, 102, 104, 106, 108 and 110 of FIG. 3. This includes creating and initializing the fields in a new file header 90 and writing the file's updated image to a portion of memory comprising file data 92. Upon validation of the new file, as indicated by file data valid state 80, the original file, which has been marked for update, becomes invalid. As discussed above, this occurs because there is now another file in FV 22 that has the same name as the original file and a state that does not=111110xxb. The act of writing the file data valid bit in state field 51 of new file header 90 has the additional effect of invalidating the original file X. The file update process is completed in a block 116, in which file deleted bit 62 is set to TRUE in the file header for the original file, file header 84, as depicted by a file deleted state 94 in FIG. 9.

Pad Files

Under the firmware file system, various file types can be used. The type of each file is identified by the value in type field 48 of the file's header. Included among these different types of files is a Pad file. A pad file gets its name from one of its common uses. It can be used to pad the location of the file that follows it in the storage media. This may be done for a variety of reasons, including fixing the location of a file in a FV, consuming space before a Volume Top File (a file added at the end of the memory space to completely fill the FV), and guaranteeing data alignment for a file to correspond with the alignment criteria specified by the alignments bits set in data alignment subfield 55 of attributes field 49. A pad file may also be used in performing file update operations where multiple files within a firmware volume are updated in lockstep, as described below.

The normal state of any valid (not deleted or invalidated) file is that both its header and data are valid. This is indicated by setting the state bits in state field 51 to State=11111000b. Pad files differ from all other types of files in that any pad file in this state should not have any data written into its data area. It is essentially a file filled with free space. In addition, file tail present bit 52 of attributes field 49 must be clear for pad files. This restriction is because if this bit was set, it would not be possible to reclaim the free space from the pad file. Since the data are of the pad file comprises free space, an extended check of the file is simply a check for any non-free data.

Since a pad file's data area is not used, it is desirable to reclaim this free space for use, if possible. This is done by using two of the pad file's state bits. Since the data area of a pad file with a State=11111000b is guaranteed to be unperturbed free space, the conventional use of the file marked for update bit 61 (i.e., as used above) would not make sense. In pad files, the meaning of this bit is overloaded to indicate that the data area is not unperturbed free space, but may have had some data written to it. This is the key to reclaiming the free space contained in a pad file.

Figure 10:
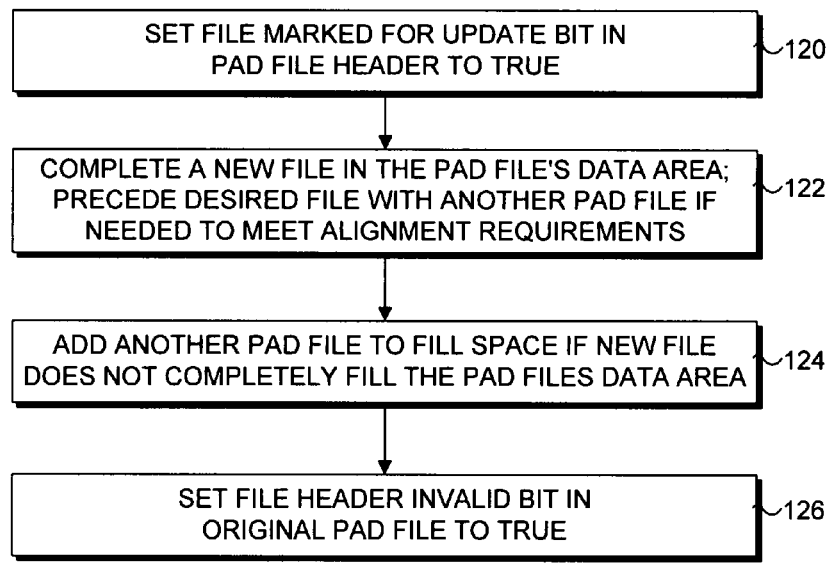
FIG. 10 is a flowchart illustrating the logic used by one embodiment of the invention when creating a file through use of a temporary pad file.

With reference to FIG. 10, free space contained within a pad file may be reclaimed by performing the following process. The process begins in a block 120 in which file marked for update bit 61 is set to TRUE in the pad file's header. As before, the transition of this and any other bit in the pad file header to the TRUE state must be atomic and fully complete before any additional writes to the firmware volume are made. This yields a State=11110000b, which indicates the pad file's data area is not guaranteed to be unperturbed free space.

Next, in a block 122, a complete new file is created and written to the pad file's data area (i.e., free space). If the new file does not have any special alignment requirement, it is created at the lowest address within the pad file. If there is an alignment requirement, it may be necessary to precede the desired file with another pad file, all written to the original pad file's data area. Regardless, the new file(s) must be written completely, including the file header and data. The state bits of this file is written such that the State=11111000b. Since the header (and therefore the state field) for the new file is really part of the pad file's data area, it is not yet visible as part of the FFS.

If the new file created in block 122 does not completely fill the pad file's data area, another pad file will need to be created to fill this space, as provided by a block 124. This file is created in the same manner as block 122, except the beginning of the new pad file's header follows the data for the file that was just created.

The process is completed in a block 126, in which file header invalid bit 63 in the original pad file is set to TRUE. This yields a State=11010000b, which indicates the pad file's header is invalid. Since the pad file's header is now invalid, the length field in the pad file's header is also no longer valid. The effect of this is that the FFS will skip the pad file's header only and look for another file header in what formerly was the pad file's data area. Since the new file's header exists at this location, it is correctly interpreted as a valid file.

File Update Using a Pad File

Figure 11:
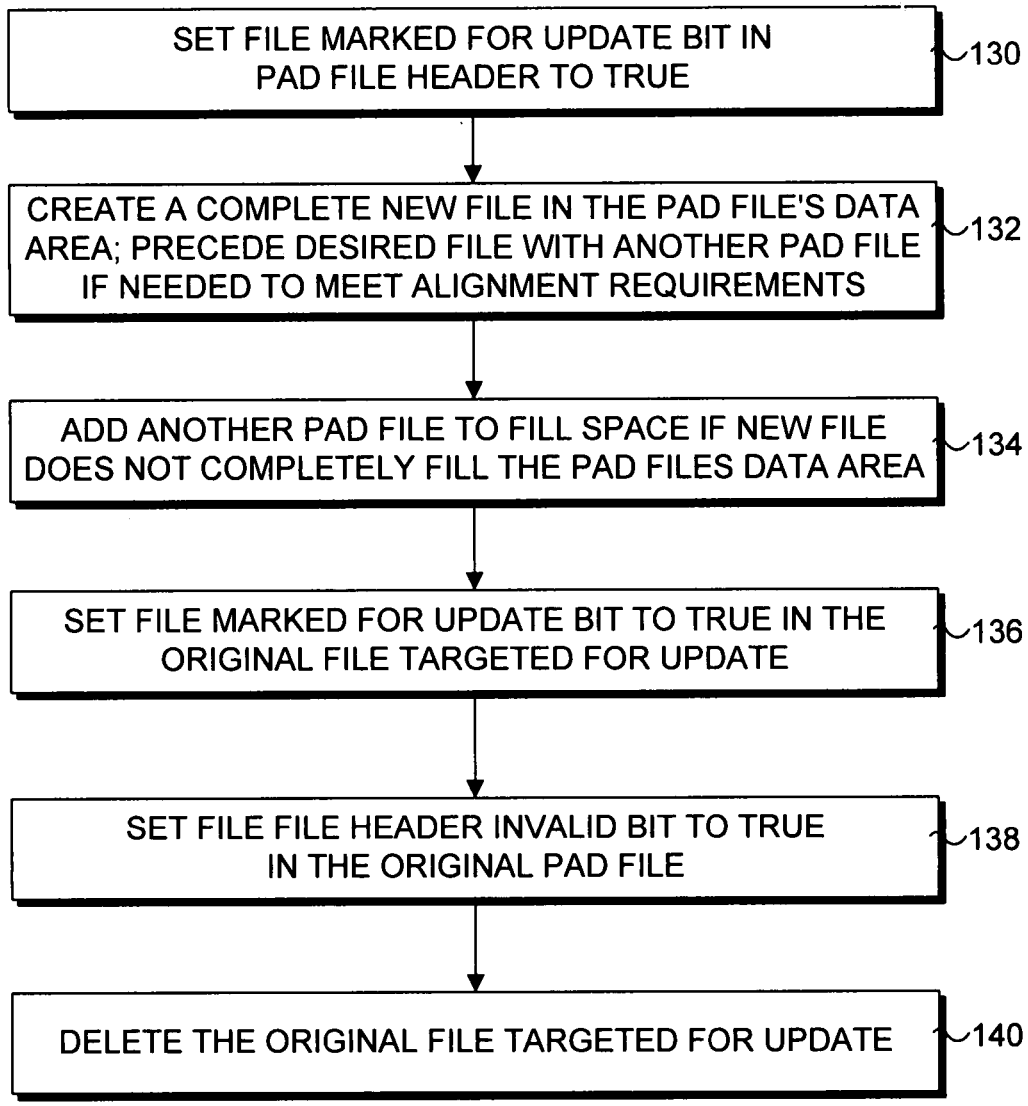
FIG. 11 is a flowchart illustrating the logic used by one embodiment of the invention when updating a file using a temporary pad file.

A file update using pad file free space is very similar to the normal file update process discussed above, except that the updated file is written into a pad file's "free" space rather than "normal" free space 28. With reference to the flowchart of FIG. 11, performing a file update using a pad file proceeds as follows. The process begins in a block 130 in which file marked for update bit 61 is set to TRUE in the pad file's header. This yields a State=11110000b, which indicates the pad file's data area is not guaranteed to be unperturbed free space.

Next, in a block 132, a complete new file is created in the pad file's data area (free space) at its lowest address (after its header). If the new file has special alignment requirements, this must be handled in the same manner as discussed above with reference to block 122 of FIG. 10. This new file must be written completely including the file header and data. The state bits of the file header for this new file are written such that a State=11111000b is indicated. Since it's really part of the pad file's data area, it is not yet visible as part of the FFS.

If the new file created in block 132 does not completely fill the pad file's data area, another pad file must be created to fill this space, as provided by a block 134. This file is created in the same manner as in block 132, except the beginning of the new pad file's header follows the data for the newly created file. File marked for update bit 61 is then set to TRUE in the original file that is targeted for update in a block 136.

Next, in a block 138, file header invalid bit 63 is set to TRUE in the original pad file to TRUE. This yields a State=11010000b, which indicates the pad file's header is invalid. Since the pad file's header is now invalid, the length field in the pad file's header is also no longer valid. The effect of this is for the FFS to skip the pad file's header only and look for another file header in what was the pad file's data area. Since the new file's header exists at this location, it is correctly interpreted as a valid file. The process is completed in a block 140 in which the original file that was targeted for update is deleted.

Atomic Update of Multiple Files

An important aspect of the invention is its ability to atomically update a plurality of FFS files in a manner that enables a complete recovery in the event of an anomaly during the update process, such as a power failure. For example, during an update process, new data is written to a FV. If a write-failure occurs during this process due to a power system failure or other system failure, the FFS can be left in an inconsistent state. However, through the use of the state bits and IntegrityCheckese field, these types of failures are detected by the FFS, which then attempts to either continue the update process at the point the failure occurred, or revert the firmware files back to their original state prior to beginning the update process.

One embodiment of an atomic update of multiple files in a firmware file system is shown in FIGS. 12-15. An atomic update updates multiple files in a FV at the same time, in lock step. If a system failure occurs during the atomic update, then the firmware file system will retain either a complete set of the old firmware files to be updated or a complete set of the new updated firmware files. The atomic update prevents the firmware volume from having the updated files be a mix of old and new versions after a system failure during the firmware files update process. It is appreciated that during an atomic update, not all of the firmware files in a FV must be updated. In general, an atomic update may be executed with two or more files in the same FV. In the following example, if two files are updated atomically, there must by a respective new file replaces each existing file. In general, the number of new files will be equal to or greater than the number of original files are to be atomically updated. In cases in which there are more new files than existing files, the extra new file(s) is simply added to the FV as a new file rather than an updated file.

Figure 13:
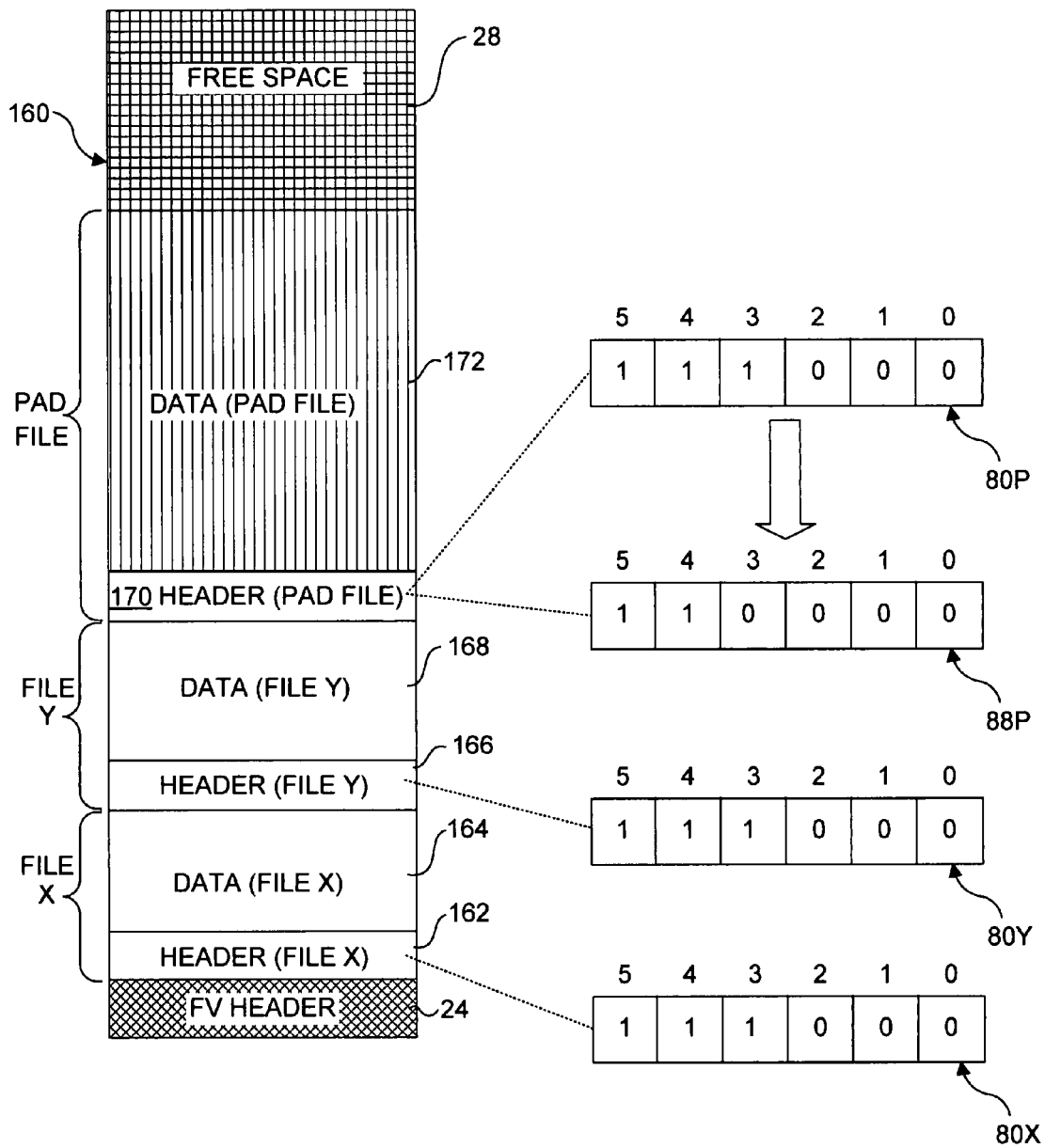
FIGS. 13-15 are schematic diagrams illustrating the sequential changes in a file header and the memory space of a firmware volume when a plurality of files are updated in the firmware volume.

Atomically updating a plurality of files involves a process that is substantially similar to the file update process discussed above with reference to FIG. 11, except in this instance, multiple original files are updated with firmware data written to the pad file's data area instead of a single file. With reference to FIG. 13, suppose an initial configuration of a firmware volume 160 includes two files, X and Y, which are to be updated to files X' and Y', respectively. File X includes a file header 162 and a data area 164, while file Y includes a file header 166 and a data area 168. State field 51 for each of file headers 162 and 166 is set so that the State=11111000b, indicating that each of file X and file Y is valid, as respectively shown by file data valid states 80X and 80Y.

Figure 12:
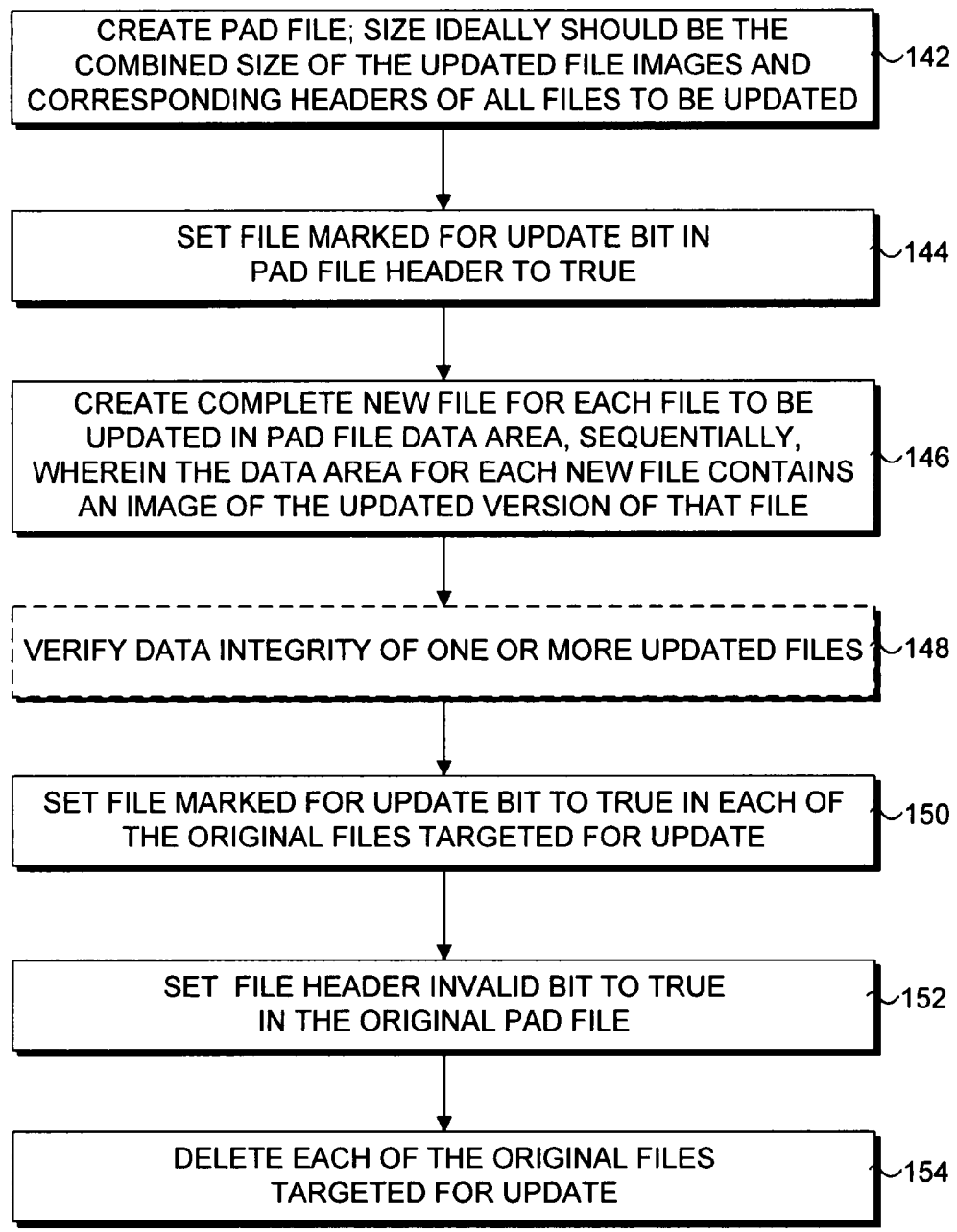
FIG. 12 is a flowchart illustrating the logic used by the invention when updating a plurality of files.

With reference to the flowchart of FIG. 12, the process of atomically updating a plurality of files begins in a block 142, in which a pad file is created, at a byte boundary immediately following the end of the FFS file occupying the highest address space (i.e., the lowest address of free space 28), in the manner discussed above for creating a file with reference to FIGS. 3-5. After the pad file is created, it will include a pad file header 170 and a data area 172. Ideally, the pad file should be sized so that it can hold the combined size of the updated file images and their corresponding file headers. In this matter, maximum memory utilization is realized. Initially, the state for the pad file will be 11111000x, indicating the pad file data is valid, as depicted by a file data valid state 80P in FIG. 13.

Figure 14:
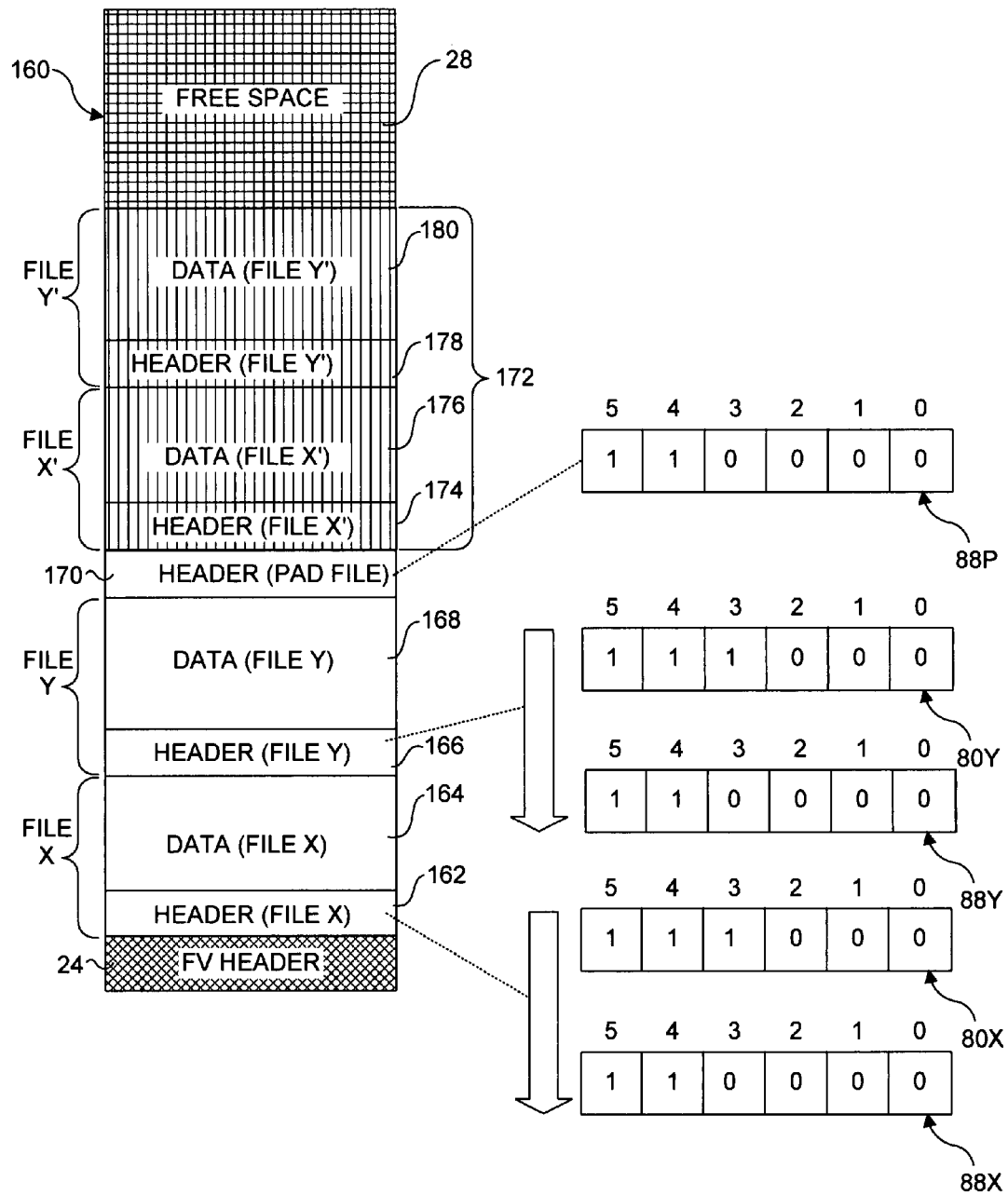
Figure 15:
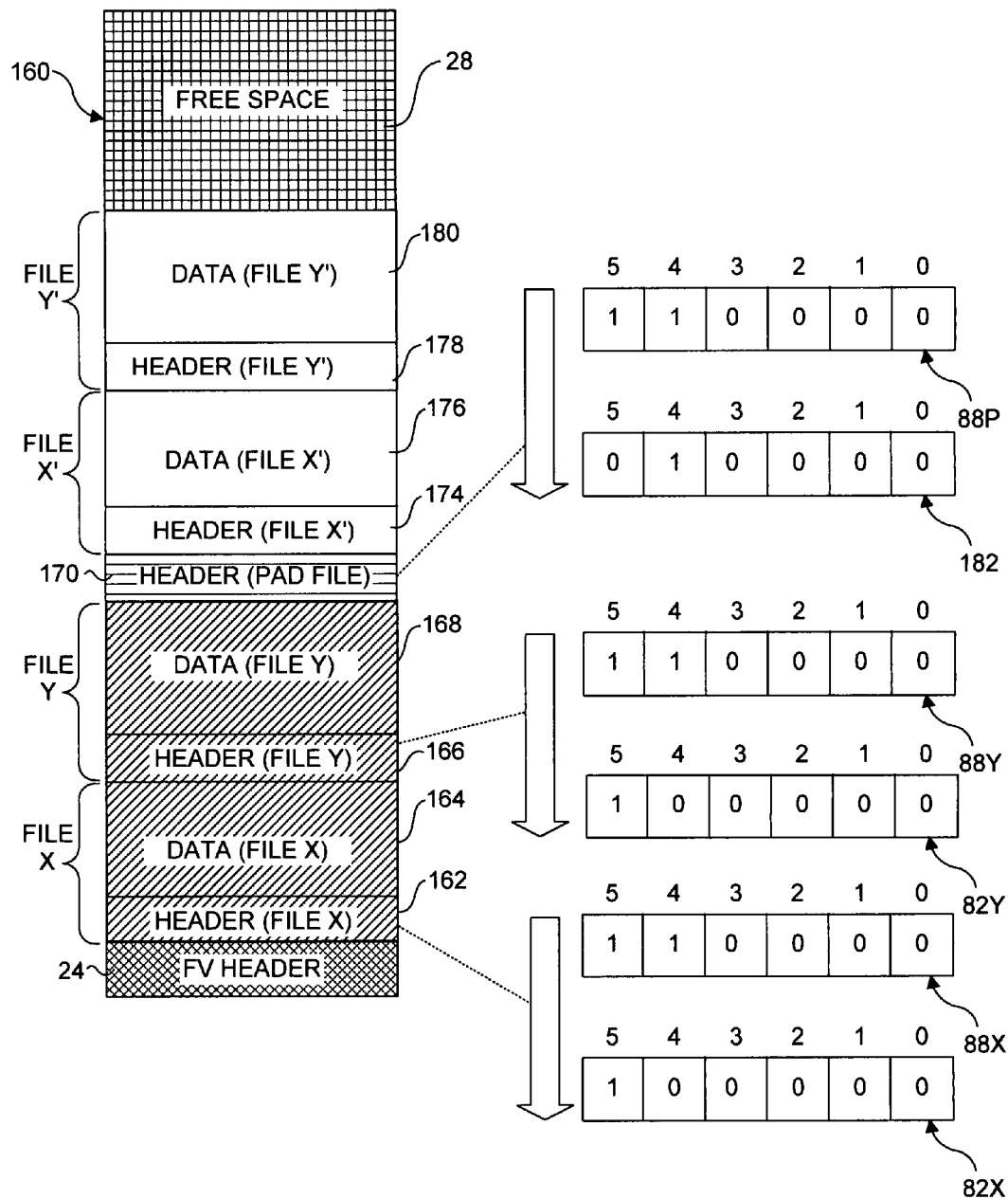

Next, in a block 144, file marked for update bit 61 is set to TRUE in the pad file's header. This is depicted by a file marked for update state 88P in FIGS. 13 and 14. At this point, in a block 146, a new file for each of the files to be updated are written to data area 172 of the pad file, in a sequential manner (i.e., a next file begins immediately following the most recently written file). This includes writing both the header and data for each file. The data for a file will comprise a file image corresponding to the updated portion of firmware that is meant to supercede the original firmware stored in the file being updated. As depicted in FIG. 14, new files X' and Y' are written during this operation, wherein file X' includes a file header 174 and a data area 176 in which an image for its updated firmware is written, and file Y' includes a file header 178 and a data area 180 in which an image for its updated firmware is written. In a manner similar to that discussed above, both of these files are "hidden" from the FFS at this point since the pad file is still marked as valid.

After the updated files are created, an optional data integrity check may be performed in a block 148 on one or more of the updated files. As described above, the data integrity check may comprise a bit-by-bit comparison check between the newly written file image and its source, a checksum comparison, or another type of file integrity check that is well-known in the art.

The logic next flows to a block 150 in which file marked for update bit 61 is set to TRUE in the header for each of the original files that are targeted for update. Each of the states for original files X and Y now=11110000x, as depicted by file marked for update states 88X and 88Y in FIGS. 14 and 15. Next, in a block 152, file header invalid bit 63 is set to TRUE in the original pad file, which now has a State=11010000x, as shown by file header invalid state 182 in FIG. 15. This invalidates the pad file header, enabling the newly updated files (e.g., file X' and Y') to become visible to the FFS. This visibility is accomplished in the following manner. Although the pad file header is invalid, it is still used to provide the location (via the nominal size of the header, e.g., 6 bytes). Accordingly, when the FFS reads pad file header 170, it recognizes that the header is invalid and moves forwards to the beginning of the file header for the first updated file written to the pad file's data area (file X' in this example). This file header contains information (via its size field 50) that is used by the FFS to locate the beginning of the header for the next file in the FV, as well.

The atomic update of multiple files is completed in a block 154, wherein each of the original files that were targeted for update are deleted by setting their file deleted bit 62 to TRUE. This changes the state of these files to 11100000x, as shown by file deleted states 82X and 82Y in FIG. 15.

The foregoing process ensures that multiple-file updates are performed in lock-step so as to guarantee that the FFS either uses the original version of the files or the updated version of the files, which no chance for mismatch between the two versions. In the event of a system anomaly, the headers of the various files can be checked to determine which state each of the files were in when the system anomaly occurred. This provides a recovery path that enables the file update process to be resumed where it was left off until the file updates are successfully completed. In contrast to prior art systems, since the FV always contains a valid set of firmware files, computer systems that implement the invention will not be prevented from rebooting in the event of a system anomaly during a firmware update process.

Exemplary Computer System for Implementing the Invention

Figure 16:
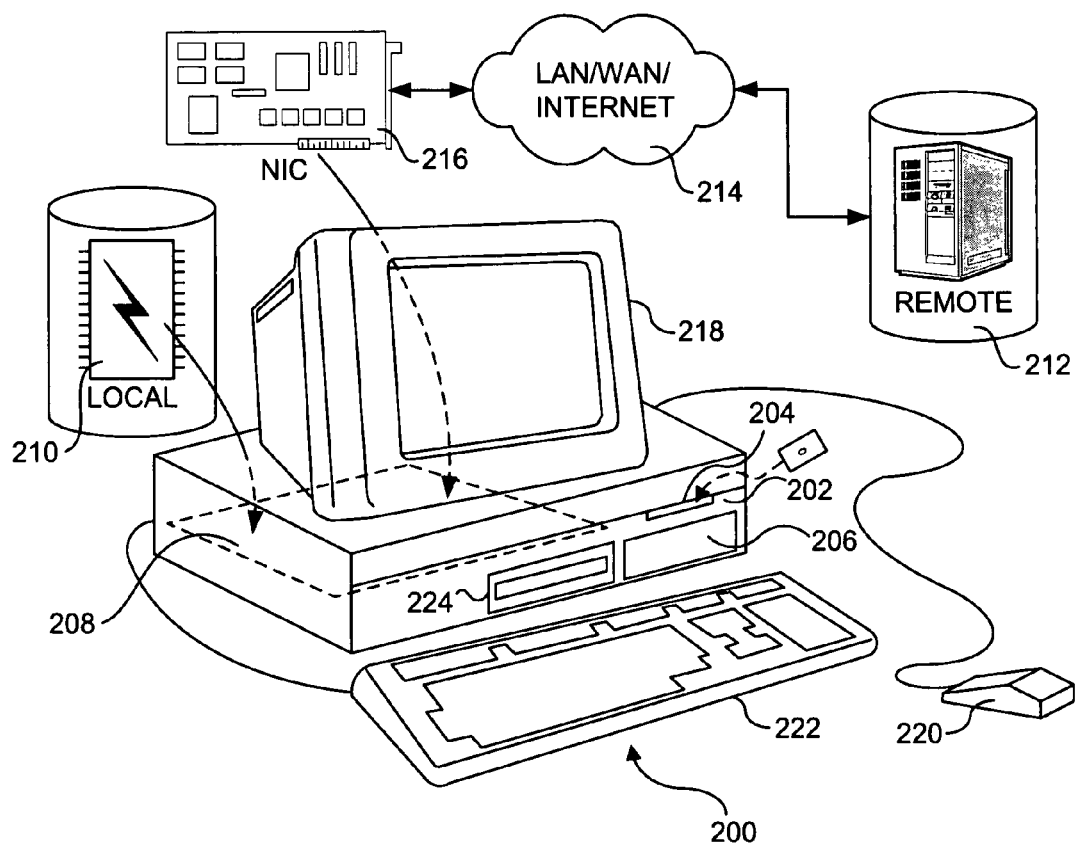
FIG. 16 is a schematic diagram of a personal computer system suitable for implementing the present invention.

With reference to FIG. 16, a generally conventional personal computer 200 is illustrated, which is suitable for use in connection with practicing the present invention. The system may be implemented using a local platform firmware architecture (e.g., all firmware is stored local to the computer using firmware storage devices such as flash devices and option ROMs, or a distributed platform firmware architecture may also be implemented, as depicted in FIG. 16. The invention may also be implemented on other computer systems as well, including workstations, laptops, and computer servers.

Personal computer 200 includes a processor chassis 202 in which are mounted a floppy disk drive 204, a hard drive 206, a motherboard 208 populated with appropriate integrated circuits including one or more microprocessors and memory modules (both not shown), and a power supply (also not shown), as are generally well known to those of ordinary skill in the art. Motherboard 208 also includes a local firmware storage device 210 (e.g., Flash Memory) on which the base portion of the BIOS firmware is stored. To facilitate access to the portion of the BIOS firmware that is retrieved from a remote firmware storage device 212 via a network 214, personal computer 200 includes a network interface card 116 or equivalent circuitry built into motherboard 208. Network 214 may comprise a LAN, WAN, and/or the Internet, and may provide a wired or wireless connection between personal computer 200 and remote firmware storage device 212.

A monitor 218 is included for displaying graphics and text generated by software programs that are run by the personal computer and which may generally be displayed during the POST test and other aspect of firmware load/execution. A mouse 220 (or other pointing device) is connected to a serial port (or to a bus port) on the rear of processor chassis 202, and signals from mouse 220 are conveyed to motherboard 208 to control a cursor on the display and to select text, menu options, and graphic components displayed on monitor 218 by software programs executing on the personal computer. In addition, a keyboard 222 is coupled to the motherboard for user entry of text and commands that affect the running of software programs executing on the personal computer.

Personal computer 200 also optionally includes a compact disk-read only memory (CD-ROM) drive 224 into which a CD-ROM disk may be inserted so that executable files and data on the disk can be read for transfer into the memory and/or into storage on hard drive 206 of personal computer 200. If the base BIOS firmware is stored on a rewriteable device, such as a Flash Memory, machine instructions for updating the base portion of the BIOS firmware may be stored on a CD-ROM disk or a floppy disk and read and processed by the computer's processor to rewrite the BIOS firmware stored on the Flash Memory. Updateable BIOS firmware may also be loaded via network 214.

Machines similar to computer 200 may be used for the various servers in the system. However, it is preferable that machines that are designed specifically for web, file and application server functions be implemented as such.

In general, from the viewpoint of hardware and software component's running on the computer system, those components will not be able to distinguish that respective portions of the BIOS firmware that are stored on local and remote storage devices. Other than the loading and initial execution of the BIOS firmware for testing system integrity and determining/verifying the system configuration and other pre-OS boot processes, a computer system implementing the invention will function in an identical manner to a conventional computer system that uses the same components and runs the same software.

Although the present invention has been described in connection with a preferred form of practicing it and modifications thereto, those of ordinary skill in the art will understand that many other modifications can be made to the invention within the scope of the claims that follow. Accordingly, it is not intended that the scope of the invention in any way be limited by the above description, but instead be determined entirely by reference to the claims that follow.

What is claimed is:

1. A system, comprising:
    a processor;
    a network interface card coupled to the processor; and
    non-transitory media on which a plurality of machine-executable instructions are stored that when executed by a machine updates an existing portion of platform firmware data partitioned into a plurality of sets of firmware code by performing the operation of:
        writing updated firmware data to a pad file in a persistent firmware memory that is different from a memory location of the existing platform firmware data so that the persistent firmware memory comprises both the existing platform firmware data and the updated platform data; and
        performing an atomic operation to modify firmware configuration data to indicate whether the existing platform firmware data or the updated platform firmware data is valid and is to be loaded and executed, such that only the existing platform firmware data will be loaded and executed before the atomic operation is performed and only the updated platform firmware data will be loaded and executed after the atomic operation is performed.

2. The system of claim 1, wherein execution of the plurality of machine instructions further performs the operation of performing an integrity check of the updated firmware data to verify that the updated firmware data is valid.

3. The system of claim 1, wherein execution of the plurality of machine instructions further enables the machine to perform a full recovery of the existing portion of firmware data that is to be updated during an upgrade process in response to a machine anomaly that prevents completion of the upgrade process.

4. A system, comprising:
    a processor;
    a network interface card coupled to the processor; and
    a non-transitory media on which a plurality of machine-executable instructions are stored that when executed by a machine updates a plurality of existing platform firmware files in persistent firmware memory wherein each of said plurality of existing platform firmware files comprises header data indicating whether or not the existing platform firmware file is valid and is to be updated by performing the operations of:
        creating a pad file at a memory location in the persistent firmware memory which is different from the memory location of the existing platform firmware files, the pad file having a data area and a header data indicating that the pad file is valid;
        writing data corresponding to a plurality of updated platform firmware files comprising new versions of the plurality of existing platform firmware files to the data area of the pad file so that the persistent firmware memory comprises both the plurality of existing platform firmware files and the plurality of updated platform firmware files, each of the plurality of update platform firmware files comprising header data indicating that the updated platform firmware file is valid and is not to be updated;

modifying the header data of each of the existing platform firmware files to indicate that the existing platform firmware file is valid and is to be updated; and performing an atomic operation to modify the header data of the pad file to indicate that the pad file is not valid, thereby indicating that the updated platform firmware files written to the data area of the pad file are to be loaded and executed instead of the existing platform firmware files.

5. The system of claim 4, wherein each file header includes a plurality of state bits that are used to track a current state of each platform firmware file during the update process.

6. The system of claim 5, wherein the temporary file is created by creating a file header that identifies the temporary file includes a data area that is sized to hold all of the updated platform firmware files, said data area being mapped to a memory area on a firmware storage device that is used to store the existing and updated platform firmware files.

7. The system of claim 6, wherein execution of the plurality of machine instructions further performs the operation of changing a state bit in the file header of the temporary file to indicate that the temporary file is invalid after data corresponding to the updated platform firmware files are written to the data area of the temporary file.

8. The system of claim 7, wherein a file system is used to access the platform firmware files and the updated firmware files appear invisible to the file system prior to when the state bit is changed and become visible to the file system after the state bit is changed.

9. The system of claim 8, wherein each existing platform firmware file has a name that is shared by a corresponding updated platform firmware file, and wherein execution of the plurality of machine instructions further performs the operations of:

changing the state bits in each of the existing platform firmware files to indicate they are to be updated; and setting the state bits in each of the updated platform firmware files to indicate that they are valid, wherein, upon becoming visible to the file system, the state bits in the file headers of the updated platform files in combination with the state bits in the platform firmware files simultaneously inform the file system that the existing platform files are invalid and the updated platform files are valid.

10. The system of claim 5, wherein execution of the plurality of machine instructions further performs the operation of setting the state bits in each file header of the existing platform firmware files to indicate the file is deleted after the upgrade process has been complete.

11. The system of claim 4, wherein execution of the plurality of machine instructions further performs the operation of performing an integrity check of the updated platform firmware files to verify that the updated firmware files are valid prior to atomically modifying the platform firmware file configuration information to indicate that the updated platform firmware files are to be used in place of the existing platform firmware.

12. The system of claim 4, wherein execution of the plurality of machine instructions further performs the operation of enabling a full recovery of the existing platform firmware files that are to be updated during the upgrade process in response to a system anomaly that prevents completion of the upgrade process.

13. A system, comprising:

a persistent firmware memory having a first memory location for existing platform firmware files and a second memory location different from the first memory location, the second memory location; and a network interface card coupled to the persistent firmware memory to update the existing firmware files by:

writing updated firmware data to a pad file in the second memory location so that the persistent firmware memory comprises both the existing platform firmware data and the updated platform data; and performing an atomic operation to modify firmware configuration data to indicate whether the existing platform firmware data or the updated platform firmware data is valid and is to be loaded and executed, such that only the existing platform firmware data will be loaded and executed before the atomic operation is performed and only the updated platform firmware data will be loaded and executed after the atomic operation is performed.

14. The system of claim 13, further comprising performing an integrity check of the updated platform firmware data to verify that the updated platform firmware data is valid.

15. The system of claim 13, wherein the updated platform firmware data is written to the persistent firmware memory in a manner in which the updated platform firmware data is invisible to a firmware management system used to access firmware data stored on the persistent firmware memory until the atomic modification of the firmware configuration data has been performed.

16. The system of claim 13, further comprising enabling a full recovery of the existing portion of platform firmware data that is to be updated during an upgrade process in response to a system anomaly that prevents completion of the upgrade process.

17. The system of claim 13, further comprising deleting the at least a portion of existing platform firmware data after it has been upgraded.

18. The system of claim 13, wherein the memory comprises a flash memory device.

\* \* \* \* \*